Sept. 9, 1969 A. S. COCHRAN ET AL 3,466,401

TELEPHONE EXCHANGE WITH INTERWORKING OF SWITCHING UNITS OF DIFFERENT TYPES

Filed March 29, 1966 5 Sheets-Sheet 1

INVENTORS.
ALFRED S. COCHRAN
FRANK B. SIKORSKI

BY Bernard E. Franz

ATTORNEY

Sept. 9, 1969 A. S. COCHRAN ET AL 3,466,401

TELEPHONE EXCHANGE WITH INTERWORKING OF SWITCHING UNITS OF DIFFERENT TYPES

Filed March 29, 1966 5 Sheets-Sheet 2

Sept. 9, 1969 A. S. COCHRAN ET AL 3,466,401

TELEPHONE EXCHANGE WITH INTERWORKING OF SWITCHING UNITS OF DIFFERENT TYPES

Filed March 29, 1966 5 Sheets-Sheet 3

Sept. 9, 1969 A. S. COCHRAN ET AL 3,466,401

TELEPHONE EXCHANGE WITH INTERWORKING OF SWITCHING UNITS OF DIFFERENT TYPES

Filed March 29, 1966 5 Sheets-Sheet 5

United States Patent Office 3,466,401 Patented Sept. 9, 1969

3,466,401

TELEPHONE EXCHANGE WITH INTERWORKING OF SWITCHING UNITS OF DIFFERENT TYPES

Alfred S. Cochran, Elmhurst, and Frank B. Sikorski, Des Plaines, Ill., assignors to Automatic Electric Laboratories, Inc., Northlake, Ill., a corporation of Delaware Filed Mar. 29, 1966, Ser. No. 538,319
Int. Cl. H04m *3/12*
U.S. Cl. 179—16 11 Claims

ABSTRACT OF THE DISCLOSURE

A switching unit having marker controlled crosspoint switching networks, may be added to office having step-by-step switches, to interwork therewith. The crosspoint and step-by-step marker switches are connected to test in parallel for the next switching stages or outgoing trunk circuits. The markers of the common control switching unit have fast electronic scanners for testing and seizing outlets to circuits of its own type. An adapter circuit *in the marker* which is used only when testing outlets to step-by-step type circuits connects a relay to each outlet, corresponding to busy test relays in the step-by-step selectors, with contacts of each relay supplying the test potentials to the electronic scanner, and with the adapter relay arranged to attempt seizure in parallel with any step-by-step selector, so that only one of the units actually seizes the outlet circuit.

Figures 1, 6:
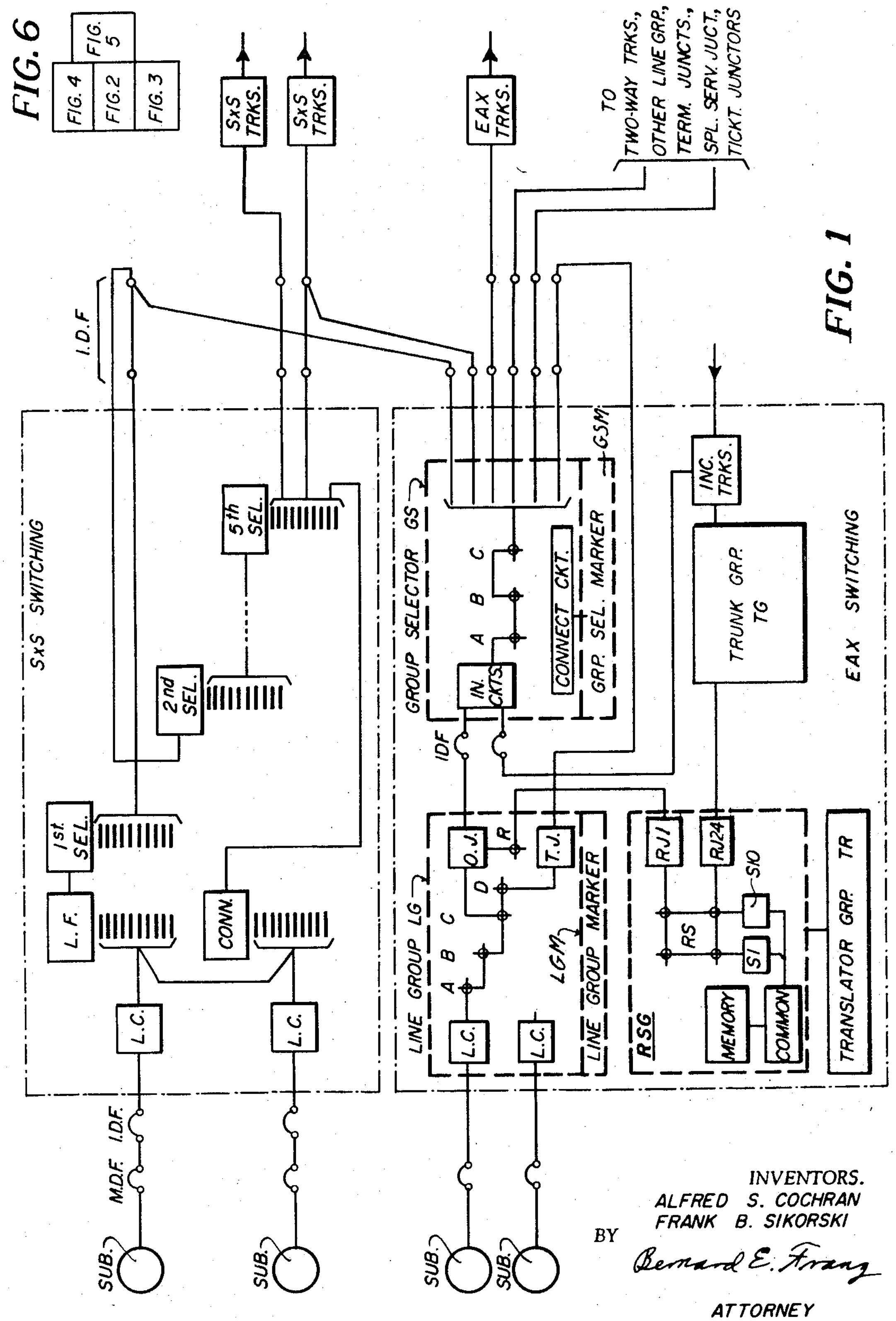

This invention relates generally to telephone exchanges with interworking of switching units of a basically different structure and control, and more particularly to the testing and seizure of outgoing trunks in an exchange in which one switching unit is of the direct controlled type and the other switching unit is of the marker controlled type having common control equipment.

The equipment disclosed in the present application is related to or used in conjunction with the systems disclosed in the following:

(1) U.S. Pat. No. 3,170,041 by K. K. Spellnes, "Communication Switching System," and the list of related cases appearing in columes 33 and 34 thereof.

(2) U.S. patent application Ser. No. 414,174 filed Nov. 27, 1964, by W. R. Wedmore et al, now Patent No. 3,413,419 entitled "Arrangement In A Communication Switching System."

(3) U.S. patent application Ser. No. 373,032 filed June 5, 1964 (Belgian Patent No. 664,670) by W. C. Miller et al., now Patent No. 3,342,942 entitled "Party Line Exchange With Interworking Of Different Type Switching Units."

(4) U.S. Pat. No. 3,210,478 by W. B. Klees et al., entitled "Communication Switching System And Outlet Testing Circuit Arrangement Therefor."

Most telephone exchanges presently in use are of the direct controlled type utilizing step-by-step equipment, such as well known Strowger switches. This equipment has proven to be of extreme reliability, and many existing exchanges are equipped with equipment which still has many years of serviceable life. However, when there is need to add or replace such equipment in view of the present trend toward high speed electronic equipment, it may be desirable that a common control switching unit, such as that indicated in the K. K. Spellnes patent, reference No. 1, be added along side of the existing direct controlled switching equipment.

However, using these two different types of switching equipment together in the same office raises a problem of compatibility. Part of the problem is that the outgoing trunks in the step-by-step equipment are accessed from the desired selector stage and differ in their circuitry from the outgoing trunks connected to the outlets of the group selector in the common controlled equipment. Calls requiring outgoing trunks between switching equipment of different types can presently be accomplished by introducing adapter circuits. Such arrangements, however, require extensive changes in the switching systems to provide compatibility including the parallel testing (idle, busy) of the trunks by both switching units.

The object of this invention is to provide an arrangement in the group selector marker of the common controlled equipment with the ability to test, and seize when idle, the outgoing trunks of the direct controlled equipment type whether assigned to the common control equipment only or shared by both switching units.

In an exchange provided with a direct controlled switching unit utilizing well known step-by-step battery searching Strowger switches the outgoing trunks are accessed from the desired selector switch stage. The presence of battery (−48 v.) in the outgoing trunk indicates the idle condition and the presence of ground potential indicates the busy condition of said outgoing trunk.

In the common control equipment the group selector marker receives the information from the register sender group concerning the destination of the call in process and proceeds with scanning of the group of outlets for an idle condition. Regardless of the destination, whether to the outgoing trunks, terminating junctors, etc., the busy-idle condition is indicated by the presence or absence of +16 v. potential on one of the group selector outlet leads.

According to the invention, an arrangement is provided in the common control equipment whereby the group selector marker upon receiving the request for service indication is able to identify the destination of the call in process, then proceed with scanning available outlets if directed to the common control equipment, in the manner described in the W. C. Miller et al. application, reference No. 3, or if directed to the direct controlled equipment to switch to the mode for scanning the outlets connected to the step-by-step equipment assigned individually or shared with the direct controlled equipment.

The above-mentioned and other objects and features of this invention and the manner of attaining them will become more apparent, and the invention itself will be better understood, by reference to the following description of an embodiment of the invention taken in conjunction with the accompanying drawings, wherein:

FIG. 1 is a symbolic block diagram of a telephone system having a direct controlled switching unit and a common controlled switching unit;

FIGS. 2–5 comprise a functional block and schematic diagrams of the invention; and FIG. 6 shows how FIGS. 2–5 are to be arranged.

FIG. 1 shows in a single line block diagram a telephone exchange comprising a direct controlled step-by-step switching unit and common control switching unit, and an intermediate distributing frame, and also shows typical connections and interconnections from the outlets of both switching units via said intermediate distributing frame.

The step-by-step switching unit, partially shown in FIG. 1, may, by way of example, be of the type described in reference No. 3 and incorporating the type of equipment described in technical bulletins published by Automatic Electric Co. cited therein.

The direct control step-by-step subscriber requiring the outgoing trunk for inter-office communication initiates the operation by lifting his handset which operates a line relay in the line circuit of the calling line. The calling line is now connected to a linefinder selector link and receives dial tone. Operation of the dial at the subscriber station transmits loop interruption pulses which cause the first selector to stop vertically to the level corresponding to the first digit, and during the interdigital pause the selector automatically steps in the rotary direction until an idle trunk is found and the connection is extended to a second selector. The succeeding selectors in like manner operate on succeeding digits. After an appropriate one of the digits, the connection is completed to an outgoing trunk circuit and thence to another office which completes the connection in response to the succeeding dialed digits.

Common control crosspoint switching unit

The common control switching unit comprises two main parts, the transmission path and the common control. The transmission path comprises line groups such as line group LG controlled by line group markers such as marker LGM, and group selectors such as selector GS controlled by group selector markers such as marker GSM. There is also a trunk group TG which provides access from incoming trunks and various special service trunks to the registers. The line group LG, the group selector GS, and the trunk group TG each comprise an arrangement of crosspoint switching matrices. The crosspoints are made up of reed capsules having two windings—an operate winding and a hold winding. The markers employ electronic circuits which provide very high speed operation, and thus make possible the very short holding time in using the markers on a one-at-a-time basis.

The common control comprises register-sender groups such as group RSG, and translator groups such as group TR. There is also a control center CC which contains a special computer for operation analysis and recording, and program upgrading equipment. Time division techniques are used in the register-sender groups RS and in the translator TR. A ferrite core memory is used in the register-sender group for temporary storage, and a magnetic drum is used in the translator for semipermanent storage.

A brief description of a typical call as processed through the common control crosspoint switching unit to a trunk will now be presented.

When a subscriber lifts the handset, the line group marker LG goes into action, by detecting the originating call mark, identifying the calling line, and selecting an idle register junctor within the register-sender. A path is then temporarily established from the calling telephone to the register junctor such as RJ1 via the A, B, C matrices, an originating junctor OJ and the R matrix, and the subscriber receives dial tone. The dialed digits are stored temporarily in the memory, coded, and processing is continued as these digits are passed to the translator TR, analyzed for type of incoming call, and instructions are selected from the drum memory and returned to the register sender to guide further handling of the call. Upon receipt of the remaining digits, the translator TR returns switching instructions corresponding to the called number as stored in the drum memory. The instructions are transmitted from the register-sender RS via one of the senders such as S1 and the originating junctor of the originating line group to the group selector GS. In the group selector GS, the instructions are analyzed by the marker GSM, an idle outgoing trunk is located, and a path established to that trunk groups via A, B and C matrices of the group selector. The remaining instructions are directed via said trunk to succeeding office.

FIGS. 2–5, when arranged as shown in FIG. 6, show a step-by-step selector 400, group selector GS of the common control equipment, an intermediate distributing frame IDF, a schematic of the step-by-step outgoing trunk 510 and an outgoing trunk 550 as used with common control equipment.

Step-by-step equipment

Figure 4:
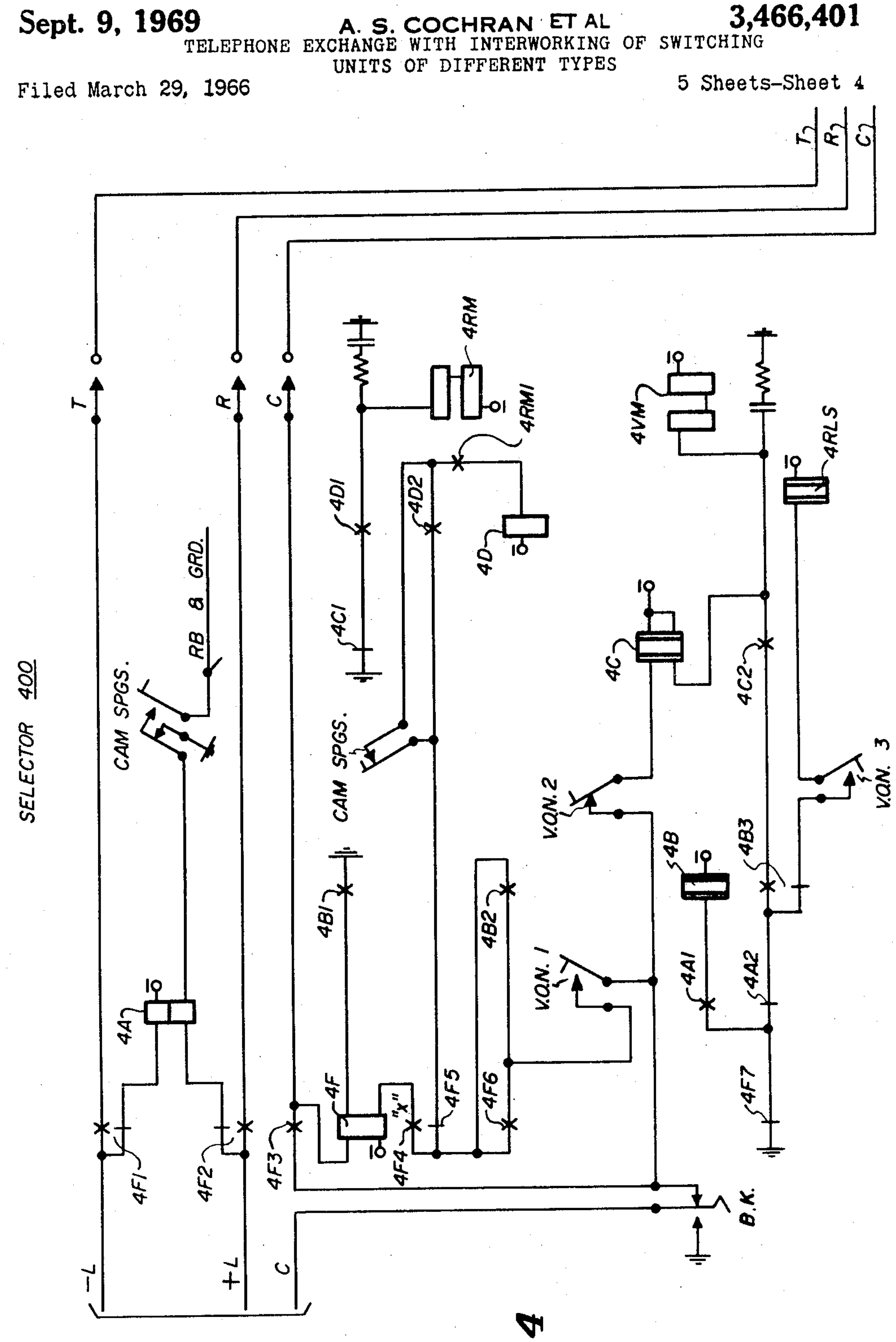

Shown in FIG. 4 is a schematic diagram of a step-by-step battery-searching selector 400. The preceding switch seeks negative battery on control lead C. When the selector 400 is seized the preceding switch grounds lead C and connects the calling line and telephone across leads −L and +L. The ground on lead C operates relay 4C. Relay 4A operates through a circuit including a direct current loop and both windings in series, and at contacts 4A1 completes a circuit to relay 4B. Slow to release relay 4B operates and at contacts 4B2 marks the switch busy to other searching selectors and extends the holding ground to the upper winding of relay 4C.

The next digit dialed by the caller steps the vertical magnet 4VM. During the return to normal, the dial pulse springs open the loop on −L and +L the number of times indicated by dialed digit. Relay 4A releases during each open period, and at contacts 4A1 completes an operating circuit from ground via contacts 4F7, 4A2, 4B3 and 4C2 to vertical magnet 4VM.

The vertical magnet operates, raises the shaft one step, and the wipers are in line with first level of bank contacts. For each succeeding pulse, the vertical magnet operates and raises the shaft and wipers one step or bank level. While the switch is being stepped to the required level, relay 4D is energized and a release path is opened at contacts VON2 to relay 4C.

After relay 4A is reoperated following the last open loop period, relay 4C releases and at contacts 4C1 and 4D1 completes an operating path to rotary magnet 4RM. Rotary magnet 4RM in conjunction with contacts 4RM1 and relay 4D repeats the horizontal stepping until an idle trunk is found or all trunk busy indication appears.

Negative battery on lead C marks an idle trunk. When wiper C engages the control bank contact of an idle trunk, an operating circuit is completed to relay 4F from the ground at contacts 4B1, an upper winding of relay 4F, bank contact C, via IDF and contacts 5B1 of the seized trunk to negative battery. Relay 4F operates, and at contacts 4F5 additionally opens the operating path to relay 4D thus preventing magnet 4RM from stepping; also at contacts 4F4, 4B2, VON1, 4F3 and wiper C prepares a locking circuit that will be completed when relay 5B in the outgoing trunk operates and returns a holding ground. Contacts 4F1 and 4F2 disconnect relay 4A, extending the calling loop through wipers T and R to the outgoing trunk, and at break contacts 4F7 opens the circuit to slow release relay 4B. The combined operate times of relays 5A and 5B in the outgoing trunk circuit 510 is much less than the release time of relay 4B, thus insuring that the ground will be returned over lead C to hold relay 4F before the circuit is broken at contact 4B3. Relay 5A in the outgoing trunk 510 operates, extending the talking loop at contacts 5A1 and 5A2 to the succeeding facilities, and at contact 5A3 completes the operating path to relay 5B. Relay 5B operates and at contacts 5B2 extends a ground potential on lead C, the ground potential on lead C holding relay 4F operated and preventing the trunk from being seized by any other switch.

The group selector, common control equipment

Figure 2:
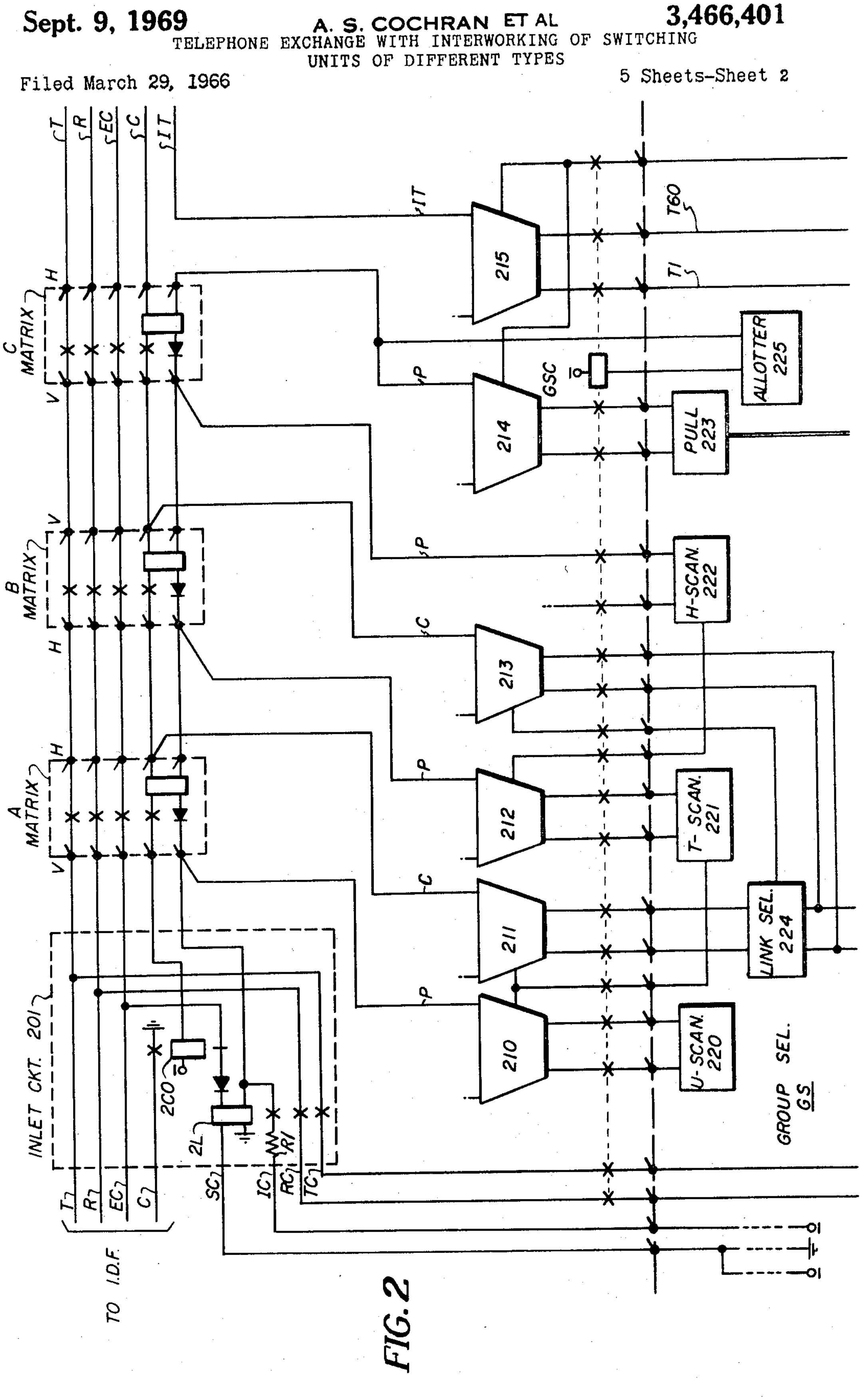
Figure 3:
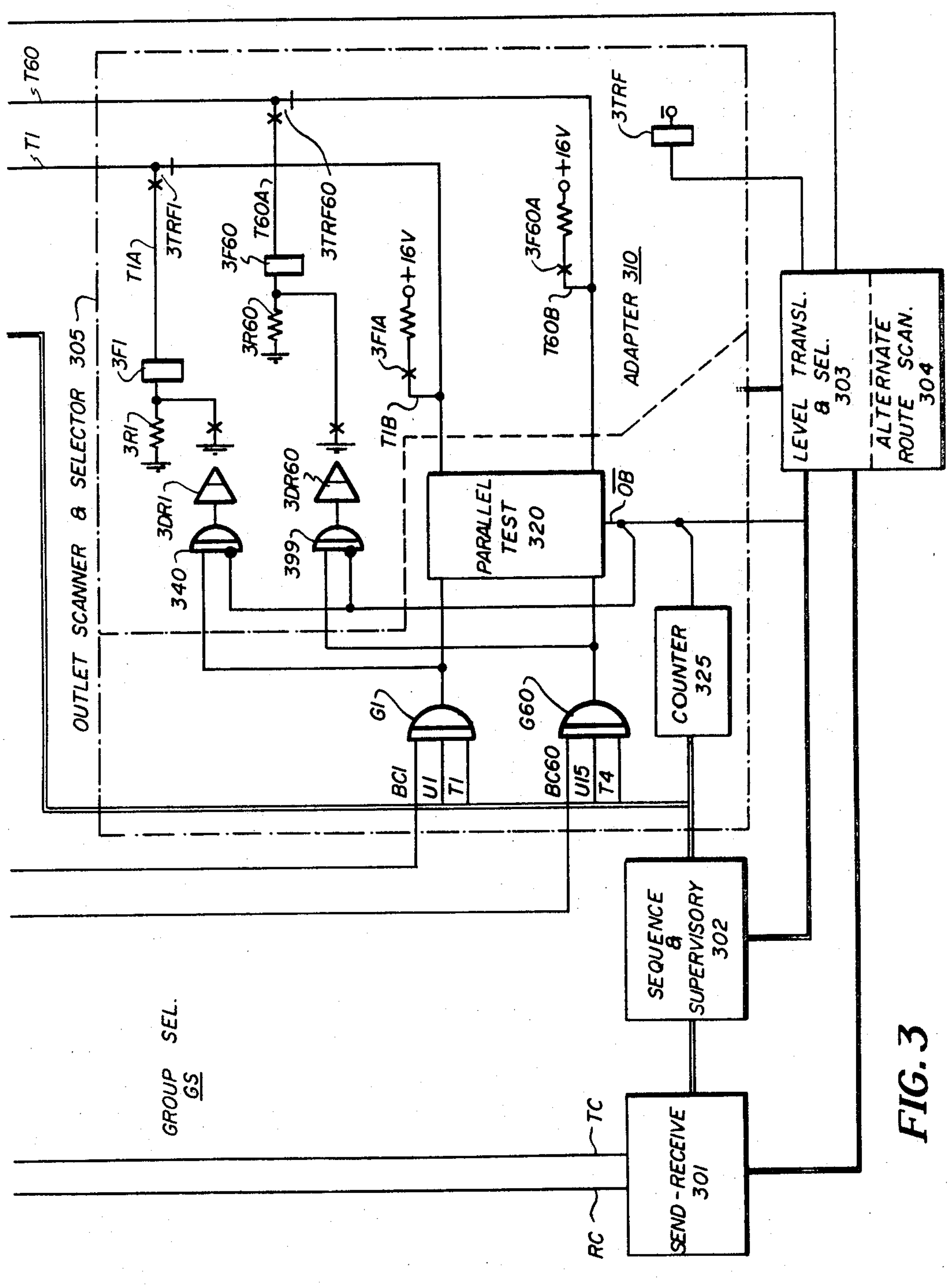

Referring to the functional block diagram of FIGS. 1, 2 and 3, the group selector and its operation will now be briefly described. For a more detailed description see the aforementioned Wedmore et al. application, reference No. 2.

When the register sender has received translated information from the translator sufficient to indicate the route for terminating the call, the sender assigner, not shown, is called to seize an idle sender and establish a connection via the register sender matrix RS to register junctor RJ. Ground potential from the sender via lead EC through the RS matrix, the register junctor RJ and originating junctor OJ causes operation of line relay 2L of the selector inlet. If the group selector marker is idle, a negative potential via lead IC, resistor R1, the contacts of relay 2L, and through the crosspoint network via lead P, indicates to the allotter 225 that the request for service mark is present. Allotter 225 energizes relay GSC to connect the calling group to the marker. Hundreds, tens and units scanners 220, 221 and 222, respectively with the associated relay trees identify the inlet circuit. All line relays of the group release except the one associated with this call.

The send-receive circuit 301 of the selector marker is now connected via group connect contacts of relay GSC, contacts of relay 2L and the T and R conductors of the line via the originating junctor, R matrix, register junctor and RS matrix to the diphase unit of the sender. The send-receive circuit 301 indicates to the sender that it is now ready to receive instruction digits. The switching digits are sent from the register memory through the diphase transceiver to the send-receive circuit 301. The instruction digits received by send-receive circuit 301 are decoded and then the switching instructions are supplied to various selecting units of the marker.

The level translator and selector 303, dependent upon the received switching digits from the send-receive circuit 301, selects a group of outlets, a maximum of sixty trunks to a group. The ten C conductors of the AB links via the relay tree 211 are connected to the link selector 224 and the link selector then switches a group of sixty BC links to the parallel test circuit 320 of the outlet scanner and selector 205. The IT conductors of the selector outlets are connected via IDF to the idle test circuits or trunks. Assuming that outgoing trunk service is requested, the idle test leads IT of that particular group are switched through the relay tree 215 via leads T1–T60 to the parallel test circuit 320. The parallel test circuit compares the available sixty BC links with sixty available outlets or trunks and when coincidence between the two is found, the connection is established from the inlet circuit, A, B, C matrix to the outgoing trunk.

The function of the parallel test circuit 320 is to test for a match between an available BC link and an available outlet and thereby select the outlet. The leads to the sixty outlets are shown connected to the right side of the parallel test circuit 320, and the sixty BC links are shown connected through individual AND gates G1–G60 to the left side. An electronic counter 325 having tens outputs T1–T4 and units outputs U1–U15 is provided to scan the sixty paths one at a time. These signals are supplied to the BC link AND gates at the parallel test circuit, and also are supplied to the matrix pull circuit 223 and to the sequence and supervisory circuits 302. Each of the BC links AND gates has one units input and one tens input so that as the counter operates only one of these AND gates is enabled at a time. If either the BC link or the outlet of a path corresponding to the counter position is busy, the "outlet busy" signal OB from the parallel test circuit 320 is true. This signal in coincidence with the sequence state signal drives the counter. When an available path is found, the signal OB becomes false and thereby stops the counter in this position. After the counter stops, one of the units signals and one of the tens signal is true and operates the corresponding relay drivers in the matrix pull unit. Also, as explained in said copending Klees et al. patent, reference 4, as soon as the parallel test circuit finds an available BC links and outlet it immediately marks the outlet busy to prevent seizure by other markers, and if two markers are simultaneously testing an outlet in parallel only one of the markers can seize the outlet.

The presence or absence of a +16 v. potential on lead IT indicates the idle or busy condition of the particular outlet tested. Assuming that the trunk 550 is being tested for availability, a +16 v. potential via contacts 582 to lead IT indicates to the marker, that the outlet is in an idle condition. The marker can then proceed with the establishment of a connection between the inlet circuit 201 and the outgoing trunk 550 in the manner previously described. When the path through matrix A, B, and C has been established, ground extended via lead EC energizes relay 580 in theoutgoing trunk 550. Relay 580 operates, at contacts 582 marks a trunk busy and at contacts 581, lead C, extends a holding ground for matrix A, B and C and an operating ground to cutoff relay 2CO in the inlet circuit. The send-receive circuit 301 indicates to the register sender via leads T and R that the connection is completed. The register sender seizes the trunk via leads T and R. Dependent on the destination, the register sender sends the remaining information either in diphase mode, multi-frequency mode or the dial pulse mode.

Assume that the existing telephone exchange with the direct controlled switching equipment is to be expanded, and that the equipment to be added is of the common control type, because of economic or traffic routing considerations, etc., it may be necessary that some of the existing outgoing trunks be shared by both switching units. However, the method of testing for idle-busy conditions and seizing of the outlets differs in each switching unit.

The direct controlled equipment trunks, such as the outgoing trunk 510, have three lead inputs (T, R and C). The idle-busy condition is detected via lead C by relay 4F in the selector switch in the manner previously described.

The common control equipment outgoing trunks, such as trunk 550, have five lead inputs (T, R, EC, C and IT). The idle-busy mark is detected via lead IT, by presence or absence of +16 v. potential, also previously described.

Therefore, to enable both switching units with compatible parallel testing of the outlets shared by both said switching units, an adapter 310 is provided in the selector group marker of the common control switching unit with means to analyze idle busy condition of the outgoing trunks of the step-by-step equipment type which is compatible to relay (F) of the step-by-step selector switch.

Figure 5:
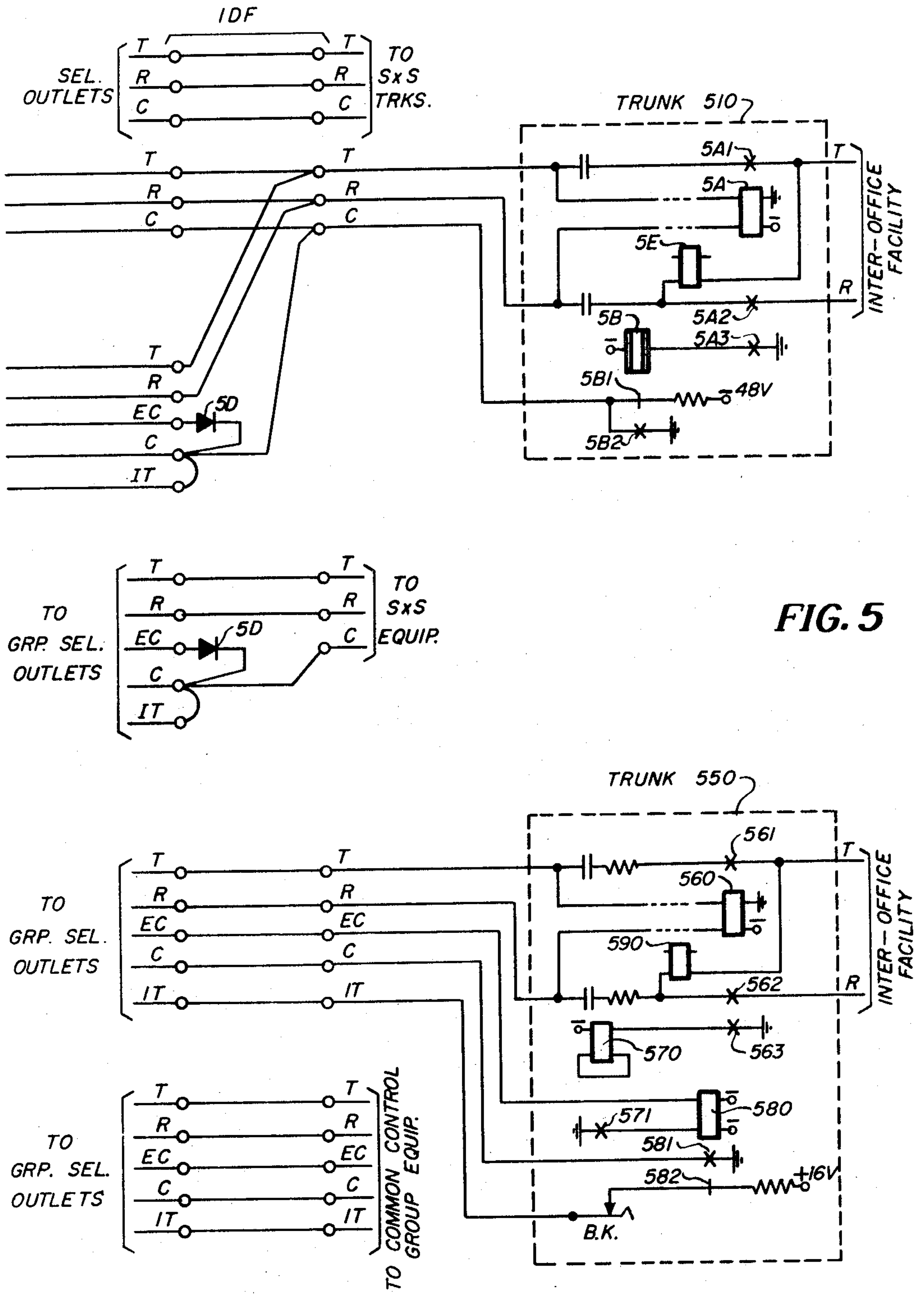

Routing of the outlets is accomplished by the intermediate distributing frame IDF shown on the left-hand side of FIG. 5. As shown, the outlets of selector 400 are connected to the step-by-step trunks used only by step-by-step equipment or to the trunks shared with the common control equipment. The outlets of group selector GS are rounted to the common control equipment, such as terminating junctors, etc., the outgoing trunks, such as trunk 550, or to the existing trunks of direct controlled equipment to be shared with step-by-step equipment or assigned only to the group selector GS.

When the outlets of group selector GS are assigned to trunks such as trunk 510, the reduction from five leads to three leads is accomplished by strapping at the IDF frame. Lead EC is strapped via diode 50 to lead C and lead IT is directly strapped to lead C.

The adapter 310 comprises a transfer relay 3TRF with sixty transfer contacts 3TRF1–3TRF60, sixty relays 3F1–3F60 with their associated contacts and AND gates 340–399. Each of relays 3F1–3F60 is connected at one side of its winding through the transfer contact to one of sixty trunk leads T1–T60, and the other side of the winding is connected both to ground via its associated resistor 3R1–3R60 and to ground via make contacts of its associated relay driver 3DR1–3DR60.

Resistors 3R1–3R60 each is of a value small enough to allow relays 3F1–3F60 to be energized when −48 v. battery potential from the associated idle trunk is present, yet large enough so the ground via any one of resistors 3R1–3R60 at its associated relay will not mark the trunk busy to other switching units.

Assume that group selector GS gets the request for service indication and the destination of the call is to step-by-step outgoing trunk 510. Previously described operation of the marker is repeated except that send-receive circuit 301 also receives the information that the call is to step-by-step equipment. This information is then recognized by the level translator and selector 303, which in addition to connecting the group of trunks requested, energizes transfer relay 3TRF. Relay 3TRF operates and at contacts 3TRF1–3TRF60 connects leads T1–T60 via leads T1A–T60A to relays 3F1–3F60 respectively. A −48 v. potential from each available trunk of the selected group energizes its associated relay 3F1–3F60 and a ground potential from the busy trunk of said group keeps its corresponding relay unoperated. Dependent on the condition of relay 3F1–3F60, contacts 3F1A–3F60A are either closed or open; therefore, a +16 v. potential or absence of said potential is registered on lead T1B–T60B. The selection of available link and available trunk proceeds in the manner previously described.

During the stepping of counter 325 a true signal on lead OB inhibits gates 340–399, causing relay drivers 3DR1–3DR60 to remain unoperated. Once coincidence between the available link and the available trunk has been found, signal on lead OB from parallel test circuit 320 becomes false, counter 325 stops, and one of the BC link AND gates is enabled. The true output from the enabled BC link gate with inverted OB false signal energizes its respective relay driver. Relay driver operates, extending ground via its contacts, associated 3F relay, transfer contacts of relay 3TRF, one of the leads T1–T60, lead IT, and strapping on IDF to lead C. The electrical characteristic of the 3F relay at this time is identical to relay 4F of the selector 400. Consequently the C lead of the trunk 510 appears as if it had been seized by a step-by-step selector.

While the group selector marker GSM is making its high speed electronic decision, trunk 510 is still available to a step-by-step selector. If the group selector marker GSM after waiting a period, still sees relay 3F operated (signal $\overline{OB}$ has not disappeared) then it can safely assume that it has truly seized trunk 510. If signal $\overline{OB}$ is gone, a step-by-step selector must have won out, and the group selector marker GSM will resume its electronic scan and repeat the process.

Seizure of the crosspoint network proceeds in the manner previously described. Ground from register sender via lead EC, crosspoint A, B and C, IDF frame diode 5D to lead C, supplies a holding path for crosspoints and relay 2CO in the inlet circuit, as well as a busy signal to the trunk before the trunk is seized via lead T and R.

There has been disclosed in the preceding description the equipment for and the manner of accessing a common group of trunks from two entirely different switching system. This disclosure, however, is not limited to use with outgoing trunks, but as will be evident to one skilled in the art, it may also be utilized for individually assigning to each unit the trunks of the other unit or to access any desired stage of the step-by-step equipment from the common control switching unit. While the principles of the invention have been described in connection with specific apparatus, it is to be clearly understood that the described apparatus is by way of example only and should not be construed as a limitation on the scope of the invention.

What is claimed is:

1. In a communication switching system, an exchange comprising first and second switching units;

said first switching unit including direct controlled stepping type selector switches having a plurality of outlets connected respectively to first type terminating circuits having a first type of busy and idle indicating potential means, the stepping type selector switches having a first type of test means to sequentially test the first type of terminating circuits to find and mark busy an idle one of them;

said second switching unit including coordinate type selector switches having a plurality of outlets connected respectively to second type terminating circuits having a second type of busy and idle indicating potential means, a marker to control the coordinate type selector switches, a plurality of test leads, and switching means (215 and GSC) selectively operated to connect the test leads from the marker individually to a group of outlets to terminating circuits, the marker having a second type of test means connected to the test leads to find and mark busy an idle terminating circuit of the second type;

a plurality of the terminating circuits of said first type connected in common to outlets of both direct controlled stepping type selector switches of the first switching unit and coordinate type selector switches of the second switching unit, said marker including an adapter having means (relays 3F1–3F60 with respective contacts 3F1A–3F60A) to adapt the busy idle indicating potential received via said test leads from the terminating circuits of the first type to permit selection with the test means of the second type, and means to return a busy marking signal to a selected first type of terminating circuit which corresponds to that returned by the direct controlled stepping type selector switches of the first switching unit.

2. In a communication switching system, the combination as claimed in claim 1, wherein each first type terminating circuit has an input comprising three conductors including a control conductor which is used by said first type of test means for detecting said first type of busy and idle indicating potential, wherein each second type terminating circuit has an input, comprising five conductors including an idle test conductor to which is applied said second type of busy and idle indicating potential, a control conductor for holding potential, and an extra control conductor for seizure after selection, the idle test conductor being connected to one of said idle test leads during test, each outlet of the coordinate type selector switches having five conductors for connection to the respective conductors of a second type terminating circuit;

and wherein each of the outlets of the second switching unit connected to a first type terminating circuit has means coupling together the idle test conductor, the control conductor, and the extra control conductor of the outlet, and the control conductor of the terminating circuit; for the test, seizure, hold, and busy marking functions.

3. In a communication switching system, the combination as claimed in claim 1, wherein said adapter further includes transfer means normally connecting said test leads to said second type of test means in the marker, and means responsive to a signal indicating selection of a group of outlets to terminating circuits of the first type to operate the transfer means to disconnect the test leads from the second type of test means and connect them individually to devices of the adapter.

4. In a communication switching system, the combination as claimed in claim 1, wherein said means to adapt the busy-idle indicating potential comprises test relays, each having a winding individually connected to said idle test leads during a test of a group of outlets to the first type of terminating circuits, the relays having contacts connected to said second type of test means to supply thereto busy-idle indicating potentials of the second type.

5. In a communication switching system, the combination as claimed in claim 4, wherein said adapter includes transfer relay means with a plurality of transfer contacts which normally connect said test leads to said second type of test means of the marker, and means responsive to a signal in the marker indicating a test of a group of outlets to first type terminating circuits to operate the transfer relay means, which operates said transfer contacts to connect the test leads individually to said test relays.

6. In a communication switching system, the combination as claimed in claim 5, wherein each first type terminating circuit has an input comprising three conductors including a control conductor which is used by said first type of test means for detecting said first type of busy and idle indicating potential;

wherein each second type terminating circuit has an input, comprising five conductors including an idle test conductor to which is applied said second type of busy and idle indicating potential, a control conductor for holding potential and an extra control conductor for seizure after selection, the idle test conductor being connected to one of said idle test leads during test, each outlet of the coordinate type selector switches having five conductors for connection to the respective conductors of a second type terminating circuit;

and wherein each of the outlets of the second switching unit connected to a first type terminating circuit has means coupling together the idle test conductor, the control conductor, and the extra control conductor of the outlet, and the control conductor of the terminating circuit; for the test, seizure, hold, and busy marking functions.

7. In a communication switching system, the combination as claimed in claim 5, wherein each of said test relays has a resistor individually connected in series with its winding, the combination of each relay winding in series with a resistor having a resistance which is small enough to allow the test relay to be energized when an idle-indicating potential is detected via the corresponding test lead from an idle terminating circuit, yet great enough that potential applied therethrough does not mark busy the terminating circuit being tested.

8. In a communication switching system, the combination as claimed in claim 7, wherein said adapter further includes a plurality of relay drivers, each having a set of normally open contacts connected in parallel to one of said resistors, means connected between said second type of test means and the relay drivers to energize one of the relay drivers responsive to selection by the second type of test means of a corresponding terminating circuit which tests idle, so that the contacts of the relay driver close to shunt the resistor connected thereto, to thereby apply a potential via the corresponding test relay winding and test lead to mark busy the selected terminating circuit.

9. In a communication switching system, the combination as claimed in claim 7, wherein said adapter further includes means responsive to selection of a terminating circuit to shunt the resistor which is in series with the corresponding test relay, to thereby apply a potential which marks busy the selected terminating circuit.

10. In a communication switching system, the combination as claimed in claim 9, wherein each direct controlled stepping type selector switch has a test relay connected via a control conductor to each terminating circuit as it is being tested, wherein responsive to a terminating circuit being tested by two test relays, one in a direct controlled stepping type selector switch, and the other in either a direct controlled stepping type selector switch or a test relay of said adapter, only one test relay fully operates to effect seizure of the terminating circuit, and wherein said marker includes means responsive to failure of a selected test relay to fully operate to proceed with the test of other test leads.

11. In a communication switching system, the combination as claimed in claim 10, wherein each first type terminating circuit has an input comprising three conductors including a control conductor which is used by said first type of test means for detecting said first type of busy and idle indicating potential;

wherein each second type terminating circuit has an input, comprising five conductors including an idle test conductor to which is applied said second type of busy and idle indicating potential, a control conductor for holding potential, and an extra control conductor for seizure after selection, the idle test conductor being connected to one of said idle test leads during test, each outlet of the coordinate type selector switches having five conductors for connection to the respective conductors of a second type terminating circuit;

and wherein each of the outlets of the second switching unit connected to a first type terminating circuit has means coupling together the idle test conductor, the control conductor, and the extra control conductor of the outlet, and the control conductor of the terminating circuit; for the test, seizure, hold, and busy marking functions.

References Cited

UNITED STATES PATENTS 3,342,942 9/1967 Miller et al.

KATHLEEN H. CLAFFY, Primary Examiner

T. W. BROWN, Assistant Examiner